United States Patent
Kuo et al.

(10) Patent No.: US 8,741,211 B2
(45) Date of Patent: Jun. 3, 2014

(54) METHOD FOR MAKING A WAFER LEVEL ALUMINUM NITRIDE SUBSTRATE

(75) Inventors: Yang-Kuao Kuo, Taoyuan County (TW); Ching-Hui ChiangLin, Taoyuan County (TW); Te-Po Liu, Taoyuan County (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 388 days.

(21) Appl. No.: 13/237,100

(22) Filed: Sep. 20, 2011

(65) Prior Publication Data
US 2013/0032975 A1   Feb. 7, 2013

(30) Foreign Application Priority Data

Aug. 4, 2011   (TW) .............................. 100127710 A

(51) Int. Cl.
*C04B 35/581*   (2006.01)
(52) U.S. Cl.
CPC ....... *C04B 35/581* (2013.01); *C04B 2235/3454* (2013.01)
USPC ....................................................... 264/668
(58) Field of Classification Search
CPC   C04B 35/581; C04B 35/632; C04B 35/6342; C04B 35/638; C04B 2235/3454; C04B 2235/604; C04B 2235/6587
USPC ....................................................... 264/668
See application file for complete search history.

(56) References Cited

U.S. PATENT DOCUMENTS

| | | | | |
|---|---|---|---|---|
| 2,929,126 | A  * | 3/1960 | Bollack et al. | 264/647 |
| 4,678,683 | A  * | 7/1987 | Pasco et al. | 427/97.5 |
| 4,952,535 | A  * | 8/1990 | Merkel | 501/98.4 |
| 2005/0269749 | A1 * | 12/2005 | Itoh et al. | 264/618 |
| 2006/0217259 | A1 * | 9/2006 | Teratani et al. | 501/98.5 |
| 2008/0076658 | A1 * | 3/2008 | Kanechika et al. | 501/98.5 |
| 2008/0200326 | A1 * | 8/2008 | Gotoh et al. | 501/98.5 |
| 2008/0300128 | A1 * | 12/2008 | Kanechika et al. | 501/98.5 |
| 2010/0043871 | A1 * | 2/2010 | Xia et al. | 136/251 |
| 2010/0093514 | A1 * | 4/2010 | Kanechika et al. | 501/98.4 |
| 2013/0032649 | A1 * | 2/2013 | Kuo et al. | 241/25 |

FOREIGN PATENT DOCUMENTS

JP   63-225507   *   9/1988

OTHER PUBLICATIONS

English Abstract of JP 63-225507.*

* cited by examiner

*Primary Examiner* — Joseph S Del Sole
*Assistant Examiner* — Russell Kemmerle, III
(74) *Attorney, Agent, or Firm* — Jackson IPG PLLC

(57) ABSTRACT

Disclosed is a method for making a pure aluminum nitride substrate. At first, aluminum nitride is mixed with a water-resistant material and an adhesive material. The mixture is made into grains in a granulation process. The grains are molded into a nugget in a steel mode by hydraulic pressure. The nugget is subjected to a cold isostatic pressing process. At a low temperature, the water-resistant material and the adhesive material are removed from the nugget. Then, the nugget, boron nitride and nitrogen are introduced into and sintered in an oven, thus providing a pure aluminum nitride substrate. The purity and quality of the aluminum nitride substrate are high. The aluminum nitride substrate can be used in a light-emitting diode. The method is simple, the yield is high, and the heat radiation of the aluminum nitride substrate is excellent.

9 Claims, 5 Drawing Sheets

METHOD FOR MAKING A WAFER LEVEL ALUMINUM NITRIDE SUBSTRATE

BACKGROUND OF INVENTION

1. Field of Invention

The present invention relates to an aluminum nitride substrate for use in a light-emitting diode and, more particularly, to a method for making a pure aluminum nitride substrate.

2. Related Prior Art

Currently, high-power LED devices convert 20% of electricity into light at most while converting the remaining 80% of the electricity into heat. The lives and efficiencies of the LED devices and the stability of the materials for packaging the LED devices would considerably be affected should the heat not be removed from the LED devices. Therefore, heat management is an important issue for the LED devices.

An LED device includes a substrate for supporting at least one LED chip. The material and quality of the substrate influence the performance of the LED device such as the luminance, efficiency and life. For a low-power LED, a Thermal conductivity aluminum oxide substrate is good enough. However, as the LED industry develops and the market grows, there is a growing demand for the high-power LED devices. However, the thermal conductivity aluminum oxide substrates heat cannot transfer from the high-power LED devices fast enough. Therefore, the thermal conductivity aluminum oxide substrates cannot be used in the high-power LED devices. To solve the problem related to the heat radiation from the high-power LED devices, attention has been paid to highly thermally conductive substrates that are made of materials with high K values, i.e., high heat transfer coefficients, so that heat can effectively be transferred from the LED chips. Heat generated by the LED chips when the LED chips operate to emit light is transferred to the substrates on which the LED chips are provided, and the heat is subsequently released to the environment from the substrates.

The conventional high-power LED devices include GaN substrates and $Al_2O_3$ substrates that emit blue light. The $Al_2O_3$ substrates are however poor regarding the heat transfer, and their heat transfer coefficients are 17 to 27 W/mK. Therefore, driven by large currents, the conventional LED devices encounter a serious problem related to heat radiation.

To solve the foregoing problem, efforts have been made to develop highly thermally conductive aluminum nitride ("AlN") substrates. The aluminum nitride substrates are highly thermally conductive, and their heat transfer coefficients are 170~250 W/mK. Furthermore, the aluminum nitride substrates are electrically isolative, erosion-resistant and refractory. The lives of the aluminum nitride substrates are long, and the physical properties of the aluminum nitride substrates are stable. Therefore, the aluminum nitride substrates can be used in the high-power electronic devices.

Conventionally, the aluminum nitride substrates are limited to 4.5-inch aluminum nitride substrates for at least two reasons. Firstly, it is difficult and hence expensive to produce the aluminum nitride substrates. Secondly, it is difficult to control the quality of the aluminum nitride substrates. For example, the aluminum nitride substrates are vulnerable to cracks due to uneven heating during the sintering. Hence, it has not been any successful attempt to produce 8-inch wafer-level aluminum nitride substrates.

The present invention is therefore intended to obviate or at least alleviate the problems encountered in prior art.

SUMMARY OF INVENTION

It is the primary objective of the present invention to provide a method for making a pure aluminum nitride substrate for use in a high-power LED device.

To achieve the foregoing objective, the method includes the steps of: providing aluminum nitride powder, adding a vapor-resistant material and an adhesive material into the aluminum nitride powder and granulating the aluminum nitride powder into aluminum nitride balls, providing hydraulic pressure for molding the aluminum nitride balls in a steel mold to provide an aluminum nitride nugget, cold isostatic pressing(CIP) the aluminum nitride nugget, removing the vapor-resistant material and the adhesive material from the aluminum nitride nugget at a low temperature, and introducing the aluminum nitride nugget, boron nitride powder and nitrogen in a boiler for sintering.

In an aspect, the vapor-resistant material is calcium silicate or laurylamine.

In another aspect, the adhesive material is PVB.

In another aspect, the granulation is executed by pelletizing.

In another aspect, the granulation is executed by screen.

In another aspect, the hydraulic pressure is 10 to 650 tons to mold the aluminum nitride balls into the aluminum nitride nugget.

In another aspect, the CIP is conducted under hydraulic pressure of 5000 to 80000 PSI.

In another aspect, the removing of the vapor-resistant material and the adhesive material from the aluminum nitride nugget is conducted at 400° C. to 600° C.

In another aspect, the boiler includes a heating mechanism.

In another aspect, the aluminum nitride nugget, the boron nitride powder and the nitrogen are introduced into a sintering box before they are introduced into the boiler.

In another aspect, the nitrogen is introduced into the boiler when the temperature in the boiler reaches 1800° C.±20%.

Other objectives, advantages and features of the present invention will be apparent from the following description With reference to the attached drawings.

BRIEF DESCRIPTION OF DRAWINGS

The present invention will be described via detailed illustration of the preferred embodiment With reference to the drawings wherein.

DETAILED DESCRIPTION OF PREFERRED EMBODIMENT

With reference to FIGS. 1 through 5, there is shown a method for making a pure aluminum nitride substrate in accordance with the preferred embodiment of the present invention.

Figure 1:
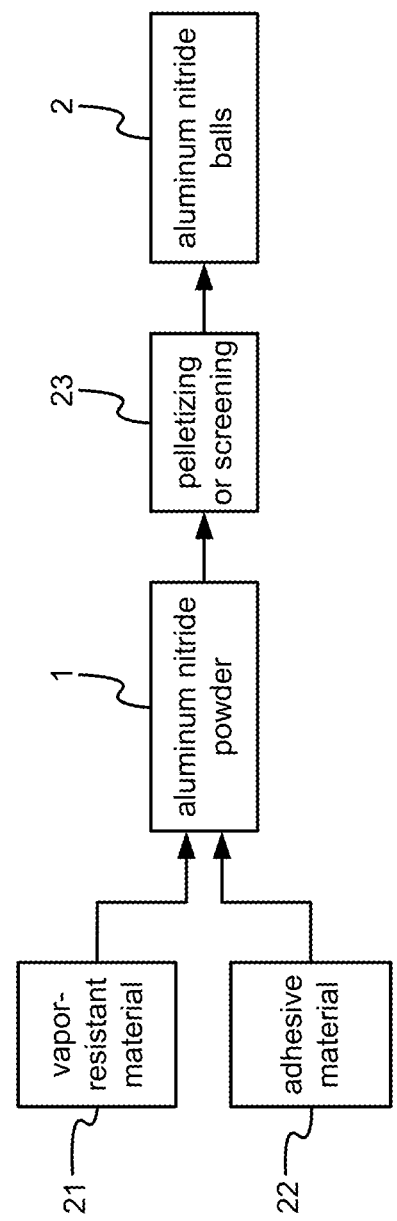
FIG. 1 is a flow chart of first and second steps of a method for making a pure aluminum nitride substrate in accordance with the preferred embodiment of the present invention.

With reference to FIG. 1, at first, aluminum nitride powder 1 is provided. The aluminum nitride powder 1 is highly pure aluminum nitride powder.

Then, a vapor-resistant material 21 and an adhesive material 22 are added into the aluminum nitride powder 1. At 23, by pelletizing or screening, the aluminum nitride powder 1 is granulated into aluminum nitride balls 2. The vapor-resistant material 21 may be calcium silicate or laurylamine while the adhesive material 22 may be PVB.

Figure 2:
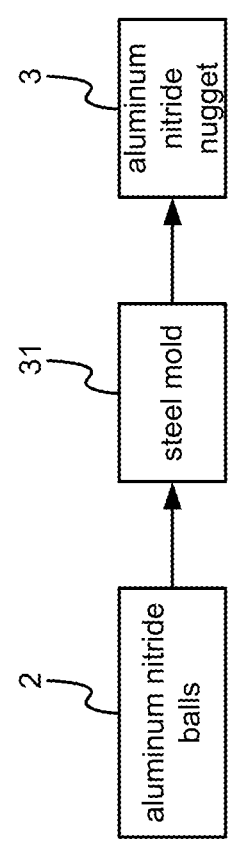
FIG. 2 is a flow chart of a third step of the method for making a pure aluminum nitride substrate in accordance with the preferred embodiment of the present invention.

With reference to FIG. 2, in a steel mold 31, under hydraulic pressure of 10 to 650 tons, the aluminum balls 2 are molded into an aluminum nitride nugget 3.

Figure 3:
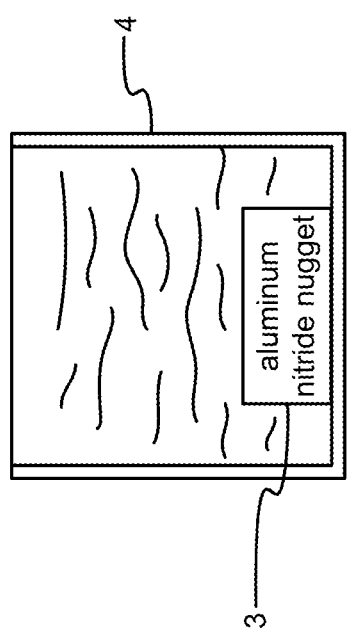
FIG. 3 is a front view of a piece of equipment for taking a fourth step of the method for making a pure aluminum nitride substrate in accordance with the preferred embodiment of the present invention.

With reference to FIG. 3, in a hydraulic pressure vessel 4, under hydraulic pressure of 5000 to 80000 PSI, the aluminum nitride nugget 3 is subjected to a cold isostatic pressing process.

Figure 4:
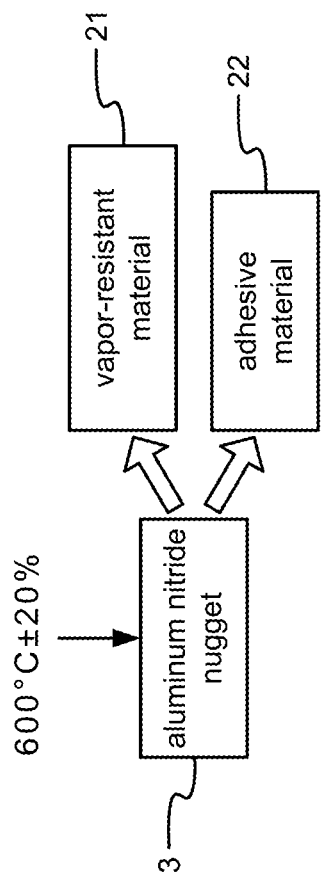
FIG. 4 is a flow chart of a fifth step of the method for making a pure aluminum nitride substrate in accordance with the preferred embodiment of the present invention.

With reference to FIG. 4, at a low temperature of 400° C. to 600° C., the vapor-resistant material 21 and the adhesive material 22 are removed from the aluminum nitride nugget 3.

Figure 5:
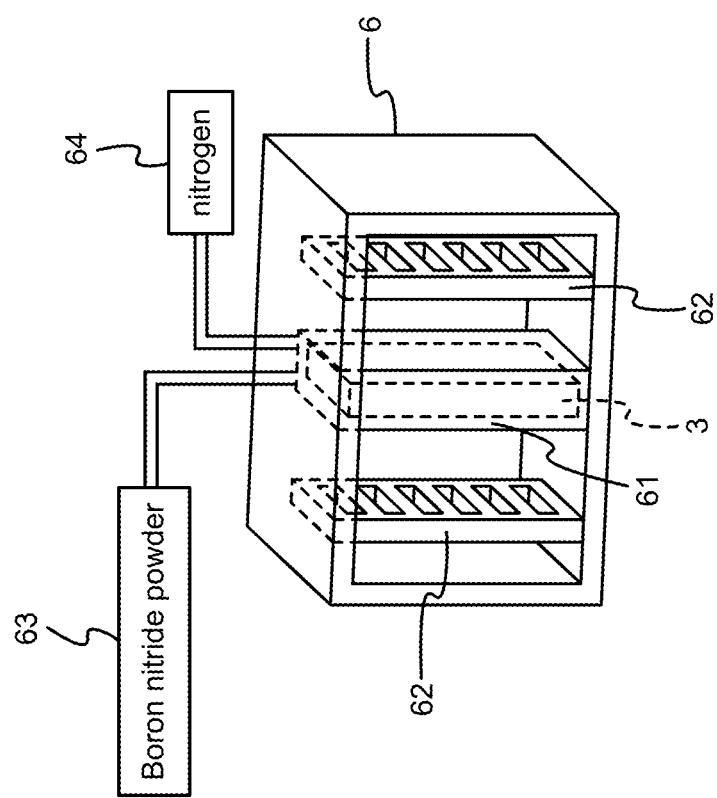
FIG. 5 is a perspective view of another piece of equipment for taking a sixth step of the method for making a pure aluminum nitride substrate in accordance with the preferred embodiment of the present invention.

With reference to FIG. 5, the aluminum nitride nugget 3 is located in a sintering box 61 before it is located in a boiler 6 equipped with a heating mechanism 62. Boron nitride powder 63 is also filled in the sintering box 61 for sintering. When the sintering temperature reaches 1800° C.±20%, nitrogen 64 is introduced into the sintering box 61.

As discussed above, the method of the present invention uses the foregoing steps to improve the isostatic performance of the sintering. Thus, a substrate made of the aluminum nitride nugget 3 is not vulnerable to cracks that could otherwise occur because of uneven heating. Therefore, the yield of the production of wafer-class aluminum nitride substrates is increased. In addition, it is possible to produce 8-inch wafer-class aluminum nitride substrates for use as radiating substrates of LED devices.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for making a pure aluminum nitride substrate including the steps of:
   providing aluminum nitride powder;
   adding calcium silicate and an adhesive material into the aluminum nitride powder and granulating the aluminum nitride powder into aluminum nitride balls;
   providing hydraulic pressure for molding the aluminum nitride balls in a steel mold to provide an aluminum nitride nugget;
   cold isostatic pressing the aluminum nitride nugget;
   removing the calcium silicate and the adhesive material from the aluminum nitride nugget at 400° C. to 600°C.; and
   introducing the aluminum nitride nugget, boron nitride powder and nitrogen in a boiler for sintering.

2. The method for making a pure aluminum nitride substrate in accordance with claim 1, wherein the adhesive material is PVB.

3. The method for making a pure aluminum nitride substrate in accordance with claim 1, wherein the granulation is executed by pelletizing.

4. The method for making a pure aluminum nitride substrate in accordance with claim 1, wherein the granulation is executed by screen.

5. The method for making a pure aluminum nitride substrate in accordance with claim 1, wherein the hydraulic pressure is 10 to 650 tons to mold the aluminum nitride balls into the aluminum nitride nugget.

6. The method for making a pure aluminum nitride substrate in accordance with claim 1, wherein the cold isostatic press is conducted under hydraulic pressure of 5000 to 80000 PSI.

7. The method for making a pure aluminum nitride substrate in accordance with claim 1, wherein the boiler includes a heating mechanism.

8. The method for making a pure aluminum nitride substrate in accordance with claim 1, wherein the aluminum nitride nugget, the boron nitride powder and the nitrogen are introduced into a sintering box before they are introduced into the boiler.

9. The method for making a pure aluminum nitride substrate in accordance with claim 1, wherein the nitrogen is introduced into the boiler when the temperature in the boiler reaches 1800° C. ±20%.

\* \* \* \* \*